United States Patent

Villarreal-Trevino

[19]

[11] Patent Number: 6,027,545
[45] Date of Patent: Feb. 22, 2000

[54] METHOD AND APPARATUS FOR PRODUCING DIRECT REDUCED IRON WITH IMPROVED REDUCING GAS UTILIZATION

[75] Inventor: Juan A. Villarreal-Trevino, Guadalupe, Mexico

[73] Assignee: Hylsa, S.A. de C.V., San Nicolas de los Garza, Mexico

[21] Appl. No.: 09/252,875

[22] Filed: Feb. 18, 1999

Related U.S. Application Data

[60] Provisional application No. 60/075,313, Feb. 20, 1998.
[51] Int. Cl.$^7$ .................................................. C21B 13/02
[52] U.S. Cl. .............................. 75/490; 75/495; 75/505; 266/155
[58] Field of Search ............................ 75/490, 495, 505; 266/155

[56] References Cited

U.S. PATENT DOCUMENTS

| | | | |
|---|---|---|---|
| 3,661,553 | 5/1972 | Frans | 75/3 |
| 3,853,538 | 12/1974 | Nemeth | 75/35 |
| 4,260,412 | 4/1981 | Summers et al. | 75/35 |
| 4,362,554 | 12/1982 | Santen | 75/11 |
| 4,362,555 | 12/1982 | Santen et al. | 75/11 |
| 5,043,011 | 8/1991 | Hauk | 75/446 |
| 5,238,487 | 8/1993 | Hauk et al. | 75/492 |
| 5,858,057 | 1/1999 | Celada-Gonzalez et al. | 75/490 |

*Primary Examiner*—Melvyn Andrews
*Attorney, Agent, or Firm*—A. Thomas S. Safford; Frommer Lawerence & Haug LLP

[57] ABSTRACT

A method and apparatus for producing DRI, prereduced materials, or the like, utilized in the steelmaking industry, where hydrogen contained in the gas stream purged from the reduction reactor is separated (preferably by means of a PSA system) and recycled to said reduction reactor. The productivity of the reduction plant is increased by using the separated hydrogen as a chemical reductant in the reactor, instead of using it as fuel. This is particularly useful in upgrading existing DRI production plants.

26 Claims, 6 Drawing Sheets

METHOD AND APPARATUS FOR PRODUCING DIRECT REDUCED IRON WITH IMPROVED REDUCING GAS UTILIZATION

RELATED APPLICATIONS

This is a continuation-in-part of provisional application Ser. No. 60/075,313, filed Feb. 20, 1998.

FIELD OF THE INVENTION

The present invention relates to a method and apparatus for the production of prereduced iron ore, Direct Reduced Iron (DRI), or the like, in an reduction system comprising a reduction reactor, a source of natural gas, which is transformed in the operation of said system by means of a reformer and/or by the catalytic action of the metallic iron within said reduction reactor, to a reducing gas having carbon monoxide and hydrogen as its main constituents, and a heating device for heating said reducing gas prior to its introduction into the reduction zone of said reduction reactor. More particularly the invention relates to a method and apparatus which allows for a higher utilization of the chemical reduction potential of the reducing gas in the reduction system with a corresponding increase in the productivity of said reduction reactor or a decrease in the make-up quantity of gas needed for a given production level. This invention provides a way for increasing productivity of existing reduction systems at lesser investment and operational costs as compared with the conventional alternatives of increasing the capacity of the reducing gas generator or of the known measure of installing a carbon dioxide removal system in the recycle stream of reducing gas.

BACKGROUND OF THE INVENTION

Direct reduction plants for producing direct reduced iron, known as DRI or sponge iron, hot briquetted iron, or the like (in general prereduced materials useful as feedstock for iron and steelmaking), currently produce such materials by contacting a reducing gas, composed principally of hydrogen and carbon monoxide, at temperatures in the range from 750° C. to 1050° C., with a bed of particulate iron-containing material in the form of lumps, pellets or mixtures thereof. The bed of iron-containing material may be static or may be descending by gravity within a reduction reactor. Examples of such processes are described in U.S. Pat. Nos. 3,749,386; 3,764,123; 3,816,101; 4,336,063; 4,428,072; 4,556,417; 5,078,787; 4,046,557; 4,002,422 and 4,375,983.

It is well known that in direct reduction systems the reducing gas and the oxides being reduced reach an equilibrium which does not allow the full utilization of the reducing gas in the reduction reactor. Consequently, for efficiency the currently operating plants recycle regenerated reducing gas in order to minimize the need of make-up reducing gas. However, there has always been the need to purge or otherwise eliminate a significant portion of the spent reducing gas available to be recycled to prevent accumulation of carbon dioxide and inert elements (such as $N_2$) in the system. The portion of gas purged normally is utilized as fuel in the reformer or gas heater of the system. This utilization as fuel recovers only the heating value of the purged reducing gas but not the chemical value of its costly hydrogen and carbon monoxide. If most of the chemical value, instead of being purged, could rather be utilized for reduction of iron oxides, then the amount of make up gas needed for a given level of production would be lowered, or alternatively the production would be increased for the same reformer capacity. Regeneration to upgrade the spent reducing gas effluent from the reduction reactor involves elimination of the reduction reaction products i.e. carbon dioxide and water which come out of the reduction reactor in the amounts determined by the chemical equilibrium of these products from the residual hydrogen, carbon monoxide, methane (and any other higher hydrocarbons present in minor amounts in the reducing gas).

It has long been known from a number of prior art references, for example U.S. Pat. No. 2,547,685 to Brassert et al; U.S. Pat. No. 4,584,016 to Becerra-Novoa et al.; U.S. Pat. No. 4,001,010 to Kanbara et al.; U.S. Pat. No. 4,129,281 to Ono et al.; U.S. Pat. No. 3,853,538 to Nemeth et al.; and U.S. Pat. No. 4,046,557 to Beggs, to remove water and carbon dioxide from the reducing gas stream which is to be recycled to the reduction reactor. Water is conventionally removed by quench cooling. For $CO_2$ removal, all these patents, however, teach the utilization of a $CO_2$ removal unit, usually of the type where the $CO_2$-containing gas is contacted with a liquid solution which reacts with said $CO_2$, and treats the recycle gas as a whole.

These chemical absorption systems have to be provided with some source of heating, normally in the form of steam, for regenerating the solution, which requirement is costly and in some applications is not readily available. The energy needed for regeneration of the $CO_2$ absorbent solution, and the capital costs for these $CO_2$ removal units of large capacity are high.

This is to be compared with the $CO_2$ removal units of the so-called Pressure Swing Adsorption (PSA) and Vacuum Pressure Swing Adsorption (VPSA) systems, which are most preferably used according to the present invention.

The PSA type gas separation systems have also long been known. Exemplary patents are U.S. Pat. Nos. 3,788,037; 4,869,894; 4,614,525; 5,026,406 and 5,152,975. See also U.S. Pat. Nos. 5,833,734 and 5,858,057. These and the other patents cited herein and their content are incorporated by reference.

OBJECTS AND SUMMARY OF THE INVENTION

In the prior art of the direct reduction processes, there is no teaching or suggestion to recover $H_2$ (and/or CO) from the gas purge, and especially there is no such teaching to do so by using physical adsorption systems of the PSA type for $CO_2/H_2$ separation. Such PSA systems rely not on a chemical reaction with $CO_2$, but rather on activated surfaces that are selective for adsorption of specific component(s) from the gas stream. In the present invention, the PSA systems preferably used, function by adsorption of the larger molecules, particularly $CO_2$, while passing mainly only the lighter $H_2$. Because of physical similarities, most of the CO is removed with $CO_2$ and the heavier molecules. Perhaps because the PSA system separates desirable CO together with the unwanted $CO_2$ from the $H_2$, thus the PSA use seems counter-intuitive. Nevertheless, the applicant has determined that PSA use overall has several distinct advantages over the more costly prior $CO_2$ solution absorption systems. The use of a PSA system results in recycling more hydrogen to the reactor by treating only the purged gas and recovering therefrom the hydrogen values of such purged gas by utilization of a PSA $CO_2$ removal unit.

This specific inventive concept also has the advantage that the unit treats a smaller amount of gas and therefore the capital costs are less, and also the regeneration of the adsorbent is made by pressure changes and not by heating (thereby requiring less energy to run). This type of gas separation produces a gas stream from the PSA unit which is rich in hydrogen, with a hydrogen content higher than 92% of the volume, which is advantageously recycled to the reactor system and used as part of the reducing gas.

The present invention thus involves recycling a first portion of the gas effluent from the reduction reactor back to said reactor and simultaneously separating for recycle a hydrogen rich gas stream from a purged second portion of said effluent gas. The separation from each other of the $H_2$ and $CO_2$ content of the purged portion of the effluent gas in the broadest aspects of the invention can be by any separation means (including absorption) but most preferably is by PSA adsorption. The ratio of said second portion to said first portion can vary widely (including from less than 1:4 to more than 1:1).

In other words, the present invention is based on the principle of separating hydrogen from the portion of reducing gas which is normally removed from the reactor system as a purge (whose only past use typically has been as a high priced source of a relatively low grade fuel). The invention thus distinguishes from the prior art in that hydrogen and carbon monoxide recycling to the reduction reactor is effected in two ways: one is a direct recycling of a portion of the effluent gas and the other is a recycling of a gas stream highly rich hydrogen obtained by the separation of $CO_2$ (and necessarily CO too, when using the preferred PSA separation system) from the gas stream which is normally purged and used as fuel. By the present invention, hydrogen is recuperated and used as chemical reductant instead of only burning it as fuel.

It is therefore an object of the present invention to provide a method and an apparatus for producing direct reduced iron in a reduction system where quality of the recycle gas is enhanced by a more effective removal of reaction products from the recycle gas and an increase in the amount of hydrogen recycled to the reactor.

It is a further object of the present invention to provide a method and an apparatus for producing direct reduced iron in a reduction system where the productivity of said system is increased by an enhanced recycling to include hydrogen separated from the purged reducing gas (which formerly was entirely purged without recycling any useful portion thereof).

It is another object of the invention to provide a method and apparatus for either or both increasing the productivity of a direct reduction system and/or decreasing the capital investment and operational costs related to the necessary upgrading of the spent recycle gas.

Other objects and advantages of the invention will be evident to those skilled in the art or will be described in this specification of the invention and the appended drawings.

According to the present invention, the objects thereof are achieved by providing a method and apparatus by the following preferred embodiment:

A method for producing DRI which comprises feeding a reducing gas mainly composed of hydrogen and carbon monoxide and also comprising methane, carbon dioxide and water, heated at a temperature between about 850° C. to about 1050° C., to a reduction reactor wherein solid particles within said reactor containing iron oxides are reduced largely to sponge iron by reaction of said iron oxides with said reducing gas; withdrawing as top gas from said reactor said reducing gas after reacting with said iron oxides; cooling and cleaning said top gas and removing water therefrom; recycling a first portion of said top gas to said reduction reactor; removing at least $CO_2$, preferably by a PSA or VPSA adsorption unit from a second portion of said top gas to form a hydrogen rich gas stream (with a hydrogen content preferably higher or equal to 92% by volume, and most typically higher than 95% by volume) and a hydrogen lean gas stream (usually containing mainly $CO_2$, CO, some $CH_4$, and residual $H_2$); and recycling said hydrogen rich gas stream to said reduction reactor.

The objects of the invention are also achieved by providing an apparatus for producing DRI which comprises a reduction reactor having a reduction zone with a gas inlet and a gas outlet; a gas cooler in fluid communication with the gas outlet of said reduction zone; a reducing gas heater in fluid communication with the gas inlet of said reduction zone; first pumping device connected to said cooler and to said heater to recycle reducing gas from said gas outlet to said gas inlet; conduit for diverting a portion of the reducing gas effluent derived from said gas outlet of said reduction zone to a second pumping device; a CO and $CO_2$ PSA or VPSA adsorption unit for separating CO and $CO_2$ from a gas stream; and conduit communicating said second pumping device to said CO and $CO_2$ PSA or VPSA adsorption unit; and conduit to communicate said CO and $CO_2$ PSA or VPSA adsorption unit with separating with the gas inlet of said reduction zone.

BRIEF DESCRIPTION OF THE DRAWINGS

In this specification and in the accompanying drawings, some preferred embodiments of the invention are shown and described and various alternatives and modifications thereof have been suggested; but it is to be understood that these are not intended to be exhaustive and that many other changes and modifications can be made within the scope of the invention. The suggestions herein given are selected and included for purposes of illustration in order that others skilled in the art will more fully understand the invention and the principles thereof and will thus be enabled to modify it in a variety of forms, each as may be best suited to the conditions of a particular use.

In each of the following figures, there is illustrated a PSA unit for treating the gas purged from the spent dewatered recycle gas for recovering and returning the $H_2$ component of the purge to the reactor.

Figure 4:
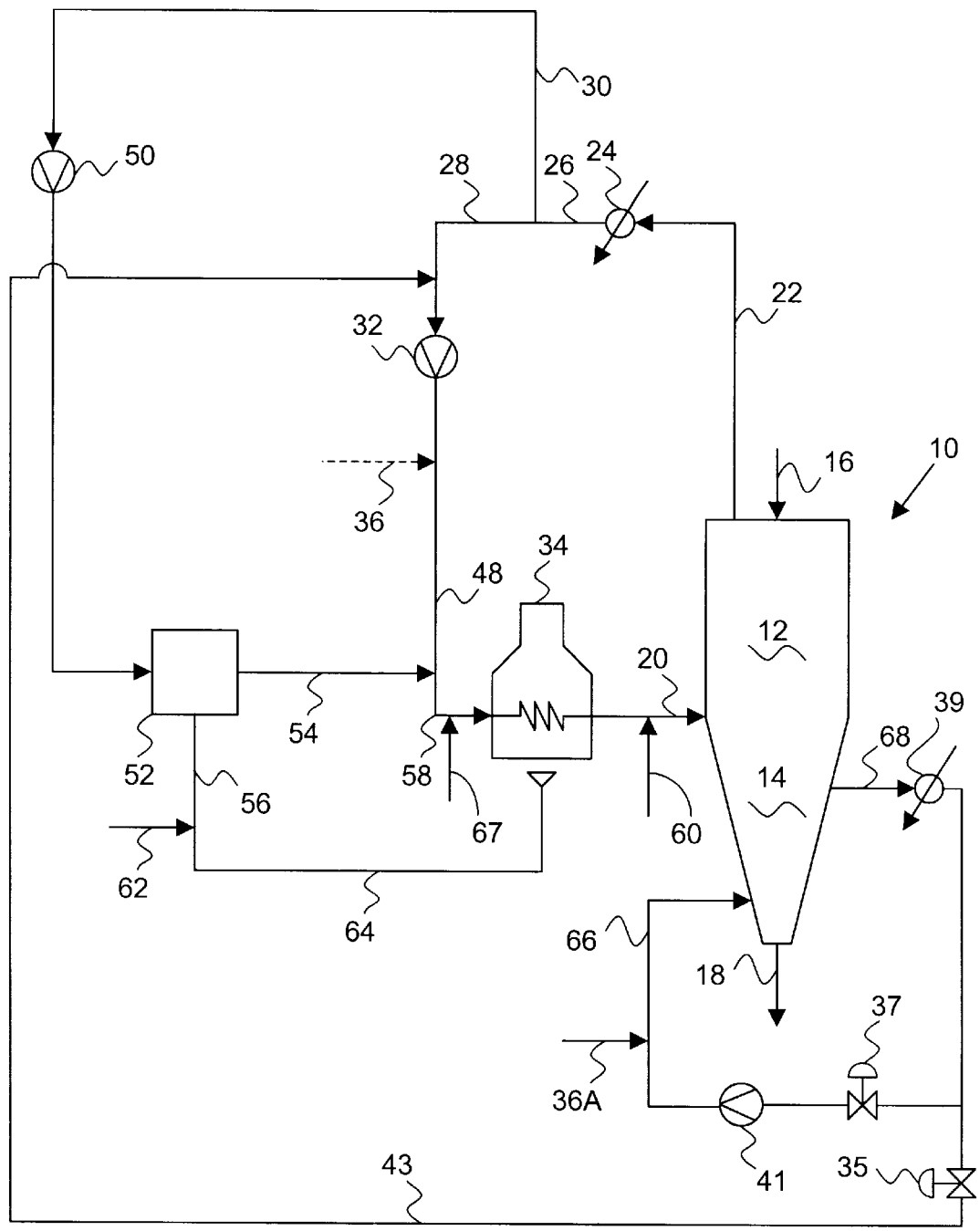
FIG. 4 shows schematically an embodiment similar to that in FIG. 2 with the difference that the natural gas feed to the reducing gas loop may be optional and there is at least a partial natural gas feed to the cooling zone, preferably with a cooling gas loop and/or a gas flow link from the cooling gas outlet to the reducing gas loop (depending on how various valves, illustrated or not, are set). In the embodiment and variations in this and the following figures the natural gas which is fed to the cooling zone cracks the methane and other hydrocarbons when contacting the hot descending DRI, allowing the deposition of carbon on the DRI and also resulting in a lighter hydrocarbons, CO, and $H_2$ gases for use in the reducing zone.
Figure 5:
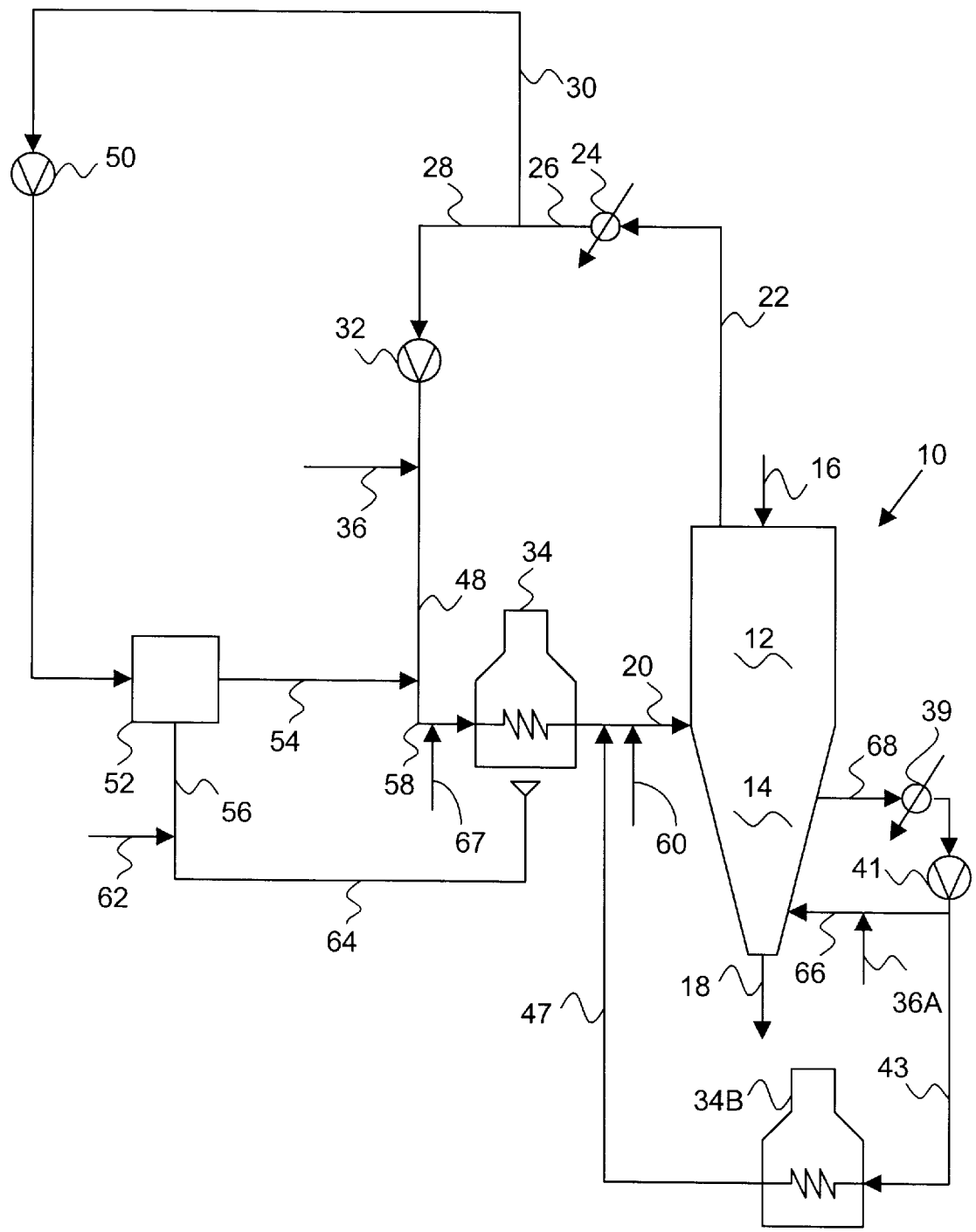
FIG. 5 shows schematically an embodiment similar to that in FIG. 4 with the difference that some recycled cooling gas is diverted and heated in a separate heater and feed to the recycle reducing gas at the inlet to the reduction zone.
Figure 6:
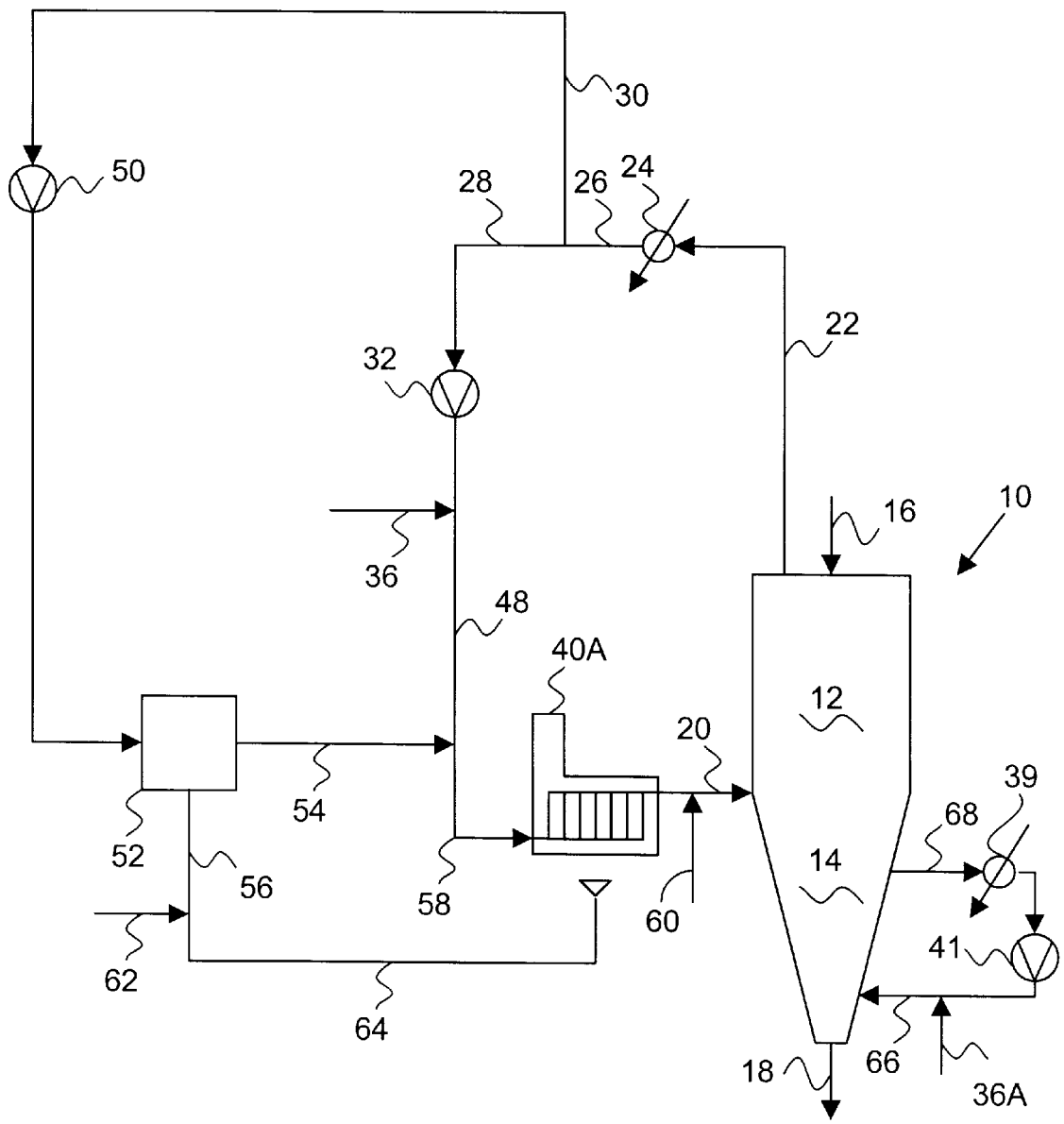
FIG. 6 shows schematically an embodiment similar to that in FIG. 3 with the difference that natural gas is fed also to the cooling gas loop.

By such introduction of natural gas into the lower part of said reduction reactor as shown in FIGS. 4–6, the resulting cooling gas stream is heated by its contact with the hot DRI within the cooling zone of the reactor and at least a significant portion of this gas is allowed to travel upwardly within said reactor to the reduction zone. See U.S. Pat. No. 4,556,417.

DETAILED DESCRIPTION OF PREFERRED EMBODIMENTS OF THE INVENTION

Figure 1:
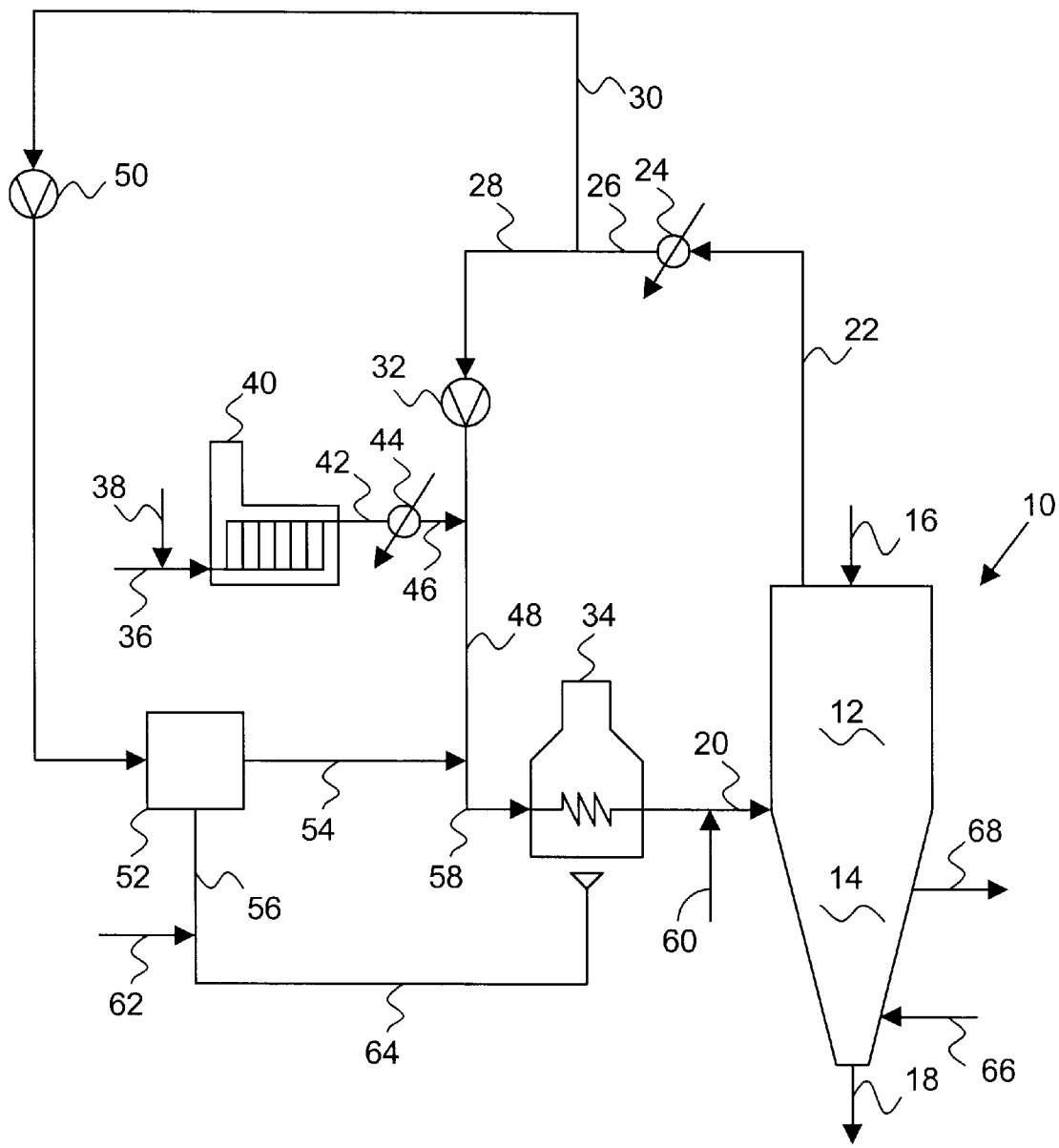
FIG. 1 shows schematically one of the preferred embodiments of the present invention, illustrated by a diagram of a moving bed process for producing DRI where the source of the $H_2$ and CO makeup reducing gas is a conventional "off line" steam/natural gas reformer, and the recovered purged $H_2$ is mixed back with the recycle gas fed through the heater and on to the reactor.

The invention is herein described as applied to direct reduction systems having moving bed reactors, but it will be understood that it can be adapted to plants having fixed bed or fluidized bed reactors. With reference to FIG. 1, numeral 10 generally designates a reduction reactor having a reduction zone 12 and a discharge zone 14. Solid particles containing iron oxides 16, for example iron ore in the form of pellets or lumps, are fed to the upper portion of the reduction zone 12 and flow downwardly through said reactor 10 where iron oxides are at least partially reduced to metallic iron and are finally withdrawn typically as DRI from the reactor 10 through the discharge zone 14 as indicated by arrow 18. A stream of hot reducing gas 20 is fed to the lower part of the reduction zone 12 comprising reductants like hydrogen and carbon monoxide as well as some oxidants like water and carbon dioxide resulting from the reduction reactions of said iron oxides and is caused to flow upwardly countercurrent to the descending solid particles. The reducing gas exits the reduction zone 12 at its upper part as top gas stream 22, which is cooled down with quenching water in a direct contact cooler 24. This cooling and washing with water cleans the top gas 22 of entrained dust and also condenses and separates the water produced by the reduction reactions. The resulting clean and cool top gas stream 26 is split into a dewatered recycle gas stream 28 and a purge gas stream 30.

The gas stream 28 is moved by a pumping device 32, which may be a blower or a compressor depending on the operating pressure of the reduction system, and is directed to a gas heater 34 before being recycled as gas stream 20 into the reduction zone 12.

Natural gas (and/or other reformable hydrocarbons) 36 and steam 38 are fed to a conventional gas-steam reformer 40 to yield hydrogen and carbon monoxide in a manner known in the art, producing a hot gas stream of reducing gas 42 which is cooled down in cooler 44 and results in a make-up reducing gas stream 46 of high reduction power. This make-up gas stream 46 is added to dewatered recycle stream 28, producing an improved cool reducing gas 48, chemically suitable for efficient reduction of iron oxides.

The other portion of cool top gas 26, namely stream 30, which in the prior art systems is a purge gas normally flared or used only unmodified as fuel in the reformer and gas heater(s), is here passed through second pumping device 50 and then treated in a Pressure Swing Adsorber unit (PSA) or a Vacuum Pressure Swing Adsorber unit (VPSA) 52, (both of which for convenience will be referred to herein generally as PSA, unless clearly indicated in the context to be the species exclusive of VPSA). The PSA unit 52 utilizes adsorbent surfaces to adsorb large molecules, mostly carbon monoxide and carbon dioxide from the gas stream 30 (which stream 30 additionally comprises methane, water and nitrogen), and produces a hydrogen rich stream 54 with a high volume % content of hydrogen of from about 92% to more than 99%, preferably higher than 95 volume %, and a lean stream 56 with a low volume % content of hydrogen on the order of 10% to 25% by volume. Stream 54 with the high hydrogen content comprises make-up gas which is combined with the recycled reducing gas stream 48 producing an enhanced reducing gas stream 58 with a content of hydrogen and carbon monoxide in volume % on a dry basis as follows:

$H_2$: 50% to 70%

CO: 10% to 17%.

The reduction potential and quality of the upgraded recycle gas stream 58 is higher as compared with the composition of reducing gas utilized in the prior art systems (even those using $CO_2$ solution absorption columns).

The temperature of the reducing gas stream 58 is raised in heater 34 to levels between about 750 to 1050° C., preferably from 900 to 950° C., suitable for efficient reduction of iron oxides. Oxygen or enriched air with oxygen 60 (having a content preferably higher than 30% in volume of oxygen) may be combined with the hot reducing gas 20 in order to obtain the higher temperatures at the reduction zone with a corresponding increase in productivity or in order to have the same productivity but requiring a lower duty in the gas heater. This productivity increase with higher temperatures is due to higher reaction rates and also to transformation of hydrocarbons present in the reducing gas to $H_2$ and CO by the partial combustion of the reducing gas with oxygen.

The lean gas stream 56 still includes among its constituents carbon monoxide and some methane, as well as small amounts of other gaseous hydrocarbons, which have heating value and may be used as fuel to fire the gas heater 34. The energy in gas stream 56 however usually is insufficient to fulfill all the heating needs of heater 34, so unreformed natural gas or other lower cost suitable fuel 62 is added to supplement said stream 56 (to produce an effective fuel supply in line 64 for the heater 34).

The DRI or prereduced materials 18 produced in the reduction zone 12 may be discharged at high temperatures on the order of 400° C. to 750° C. and can be hot briquetted or pneumatically transported to steelmaking furnaces, for example electric arc furnaces, thus reducing the energy needs in such steelmaking operations. optionally, the DRI is cooled down in the discharge zone 14 by contact of the hot DRI with a cooling gas stream 66 comprising natural gas, a portion of the reducing gas stream 30 or stream 56, or other suitable gas which does not reoxidize said DRI. The discharge zone cooling gas effluent 68 may be cooled down and recycled as stream 66 in a manner known in the art.

Figure 2:
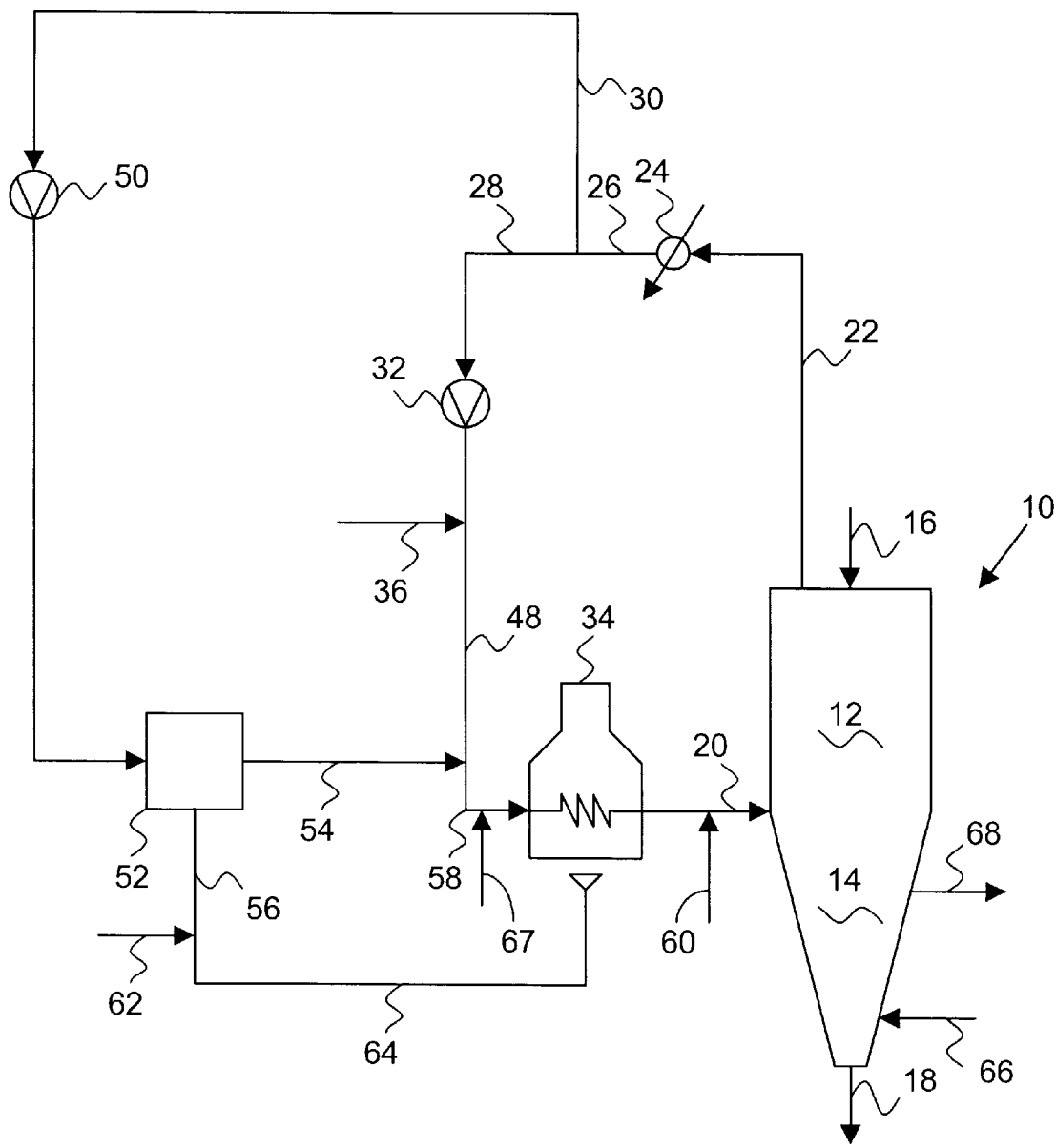
FIG. 2 shows schematically another embodiment of the invention where the reducing gas is produced within a "self-reforming" reduction system by a natural gas reformation within said system (where no reformer is needed and the added natural gas make up by reaction with oxidants $H_2O$ and $CO_2$ is transformed into hydrogen and carbon monoxide within said system, particularly within the reduction reactor by the catalytic action of the reduced iron present in said reactor), and the $H_2$ recovered from purge gas is returned to the heater in a manner similar to FIG. 1.

Referring now to FIG. 2, where the same numerals are used here (and in all the other figures also) to designate the same elements as in FIG. 1, this embodiment of the invention illustrates the invention as incorporated in a reduction system where the reducing gas is not generated in a natural gas-steam reformer but is generated by reformation of natural gas by partial combustion of methane present in the reducing gas with oxygen and/or by methane cracking and reformation with oxidants present in the reduction zone by the catalytic action of the iron-bearing particles in said reduction zone. In this embodiment the steam reformer 40 is dispensed with and a make up stream of natural gas 36 is instead added directly to the recycled gas stream 28, which is then combined with the hydrogen rich stream 54 to produce a combined gas stream 58. The water content in the gas stream 58 is adjusted by addition of water/steam stream 67 so that the amount of water present is between 3% and 10% by volume, suitable to be sufficient to carry out such reformation of methane within the reduction zone. This water regulation may also be effected for example as described in U.S. Pat. No. 5,110,350, where the water added at 67 is advantageously taken from the hot water effluent from gas cooler 24.

Figure 3:
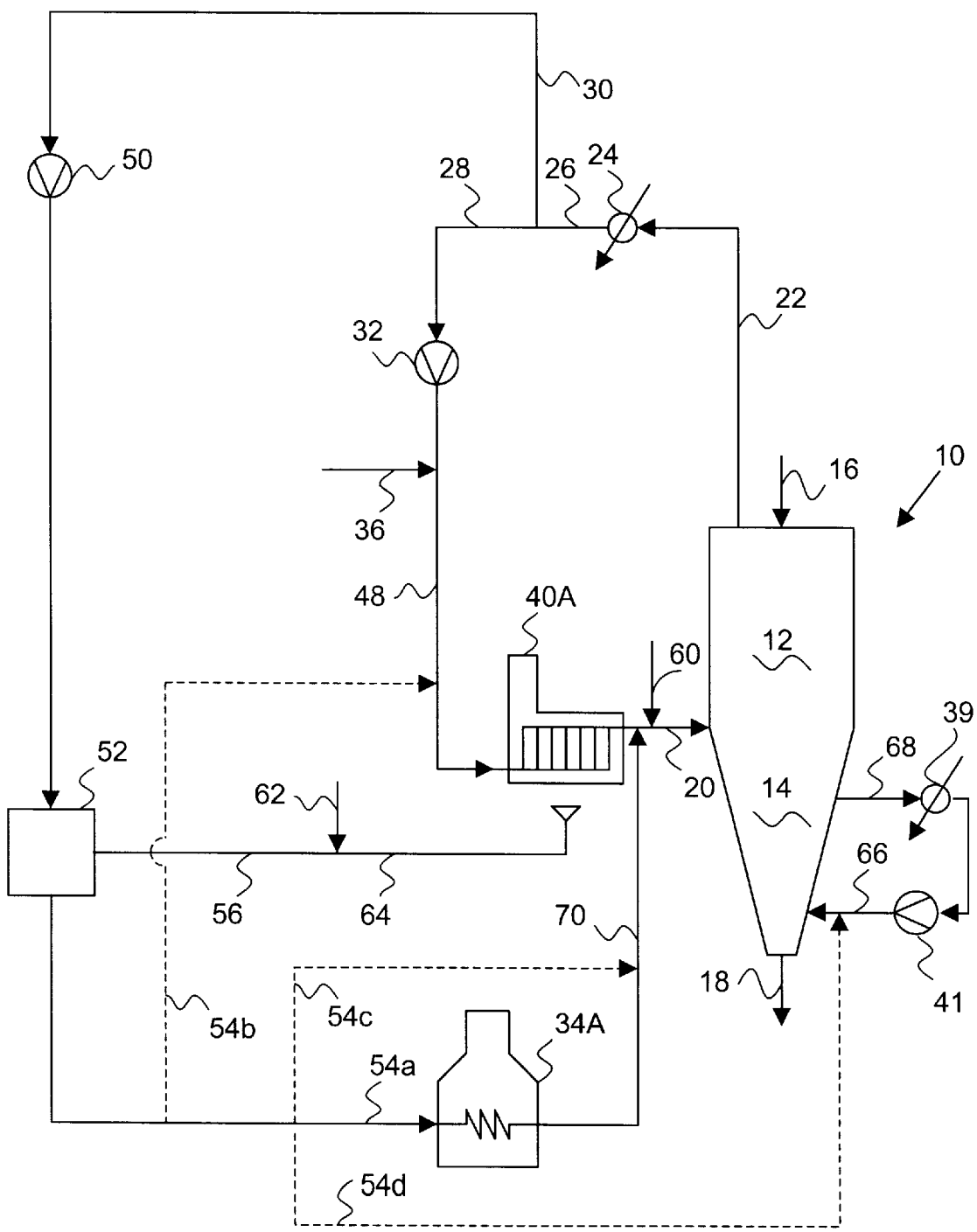
FIG. 3 shows schematically a further embodiment of the invention plus three additional illustrative alternative variations (shown in dotted lines), where the reducing gas is produced in a $CO_2$-natural gas "in line" reformer and added make up natural gas is combined in the reformer with the existing oxidants $H_2O$ and $CO_2$ present in the recycle reducing gas. In the variations of this embodiment, the hydrogen recuperated by the PSA unit for recycle to the reduction zone of the reactor can be 1) fed to the reformer for heating (if the later is of sufficient capacity), 2) heated in a separate heater (by-passing the reformer, useful in avoiding need to modify a reformer when upgrading an existing plant installation), 3) fed to the outlet from the reformer (relying on an oxygen-fed partial combustion for heating, reducing the size and cost of the reformer), or 4) fed to the cooling gas inlet of the reduction reactor (relying on a heat exchange with the hot DRI descending in the cooling zone of the reactor, while at least partially flowing upwardly into the reduction zone). The cooling loop shown in any of these drawings can be omitted for those installations where the DRI is to be discharged hot for briquetting or hot charging directly to an EAF.

FIG. 3 illustrates the invention as applied to a reduction system where the reducing gas is generated in a reformer 40A of the type where natural gas from source 36 is combined with recycled gas 28 from the reduction reactor and reacts in the presence of a catalyst with oxidants such as the $CO_2$ and $H_2O$ present in said recycled gas. This is sometimes referred to as an "in-line" reformer (as contrasted with the "off-line" reformer 40 of FIG. 1; which latter reformer does not act on the recycled gas, being outside of the recycle gas loop). Examples of these "in-line" reduction systems are U.S. Pat. Nos. 3,748,120 and 3,749,386. In these types of reduction systems, the reformer 40A also functions as a heater, being fed with a combination of relatively cool natural gas 36 and recycled gas 28, and the reducing gas produced exits the reformer at a temperature between 800° C. and 950° C. In this embodiment, the temperature of the reducing gas may also be increased by an addition of a stream of oxygen or of air enriched with oxygen 60 in order to increase the productivity of the reduction reactor (at a small sacrifice in reducing potential of the gas 20). For existing operating reduction systems, the reformer 40A most probably does not have sufficient capacity for heating the additional amount of hydrogen rich gas stream and consequently as a supplement or alternative to $O_2$-addition a separate gas heater 34A fed by the hydrogen rich stream 54a can be provided for this purpose (which feeds the hot hydrogen rich stream through line 70 to line 20, preferably downstream of line 60).

FIG. 3, as illustrated, includes a further variation where the hydrogen rich stream 54b is heated in the reformer 40A without the need of a separate heater, assuming that the reformer has sufficient heating capacity for heating the additional amount of hydrogen rich gas. Although it is preferred to provide the additional heater 34A (because in this way the recycled hydrogen rich stream 54a does not need to pass through the catalyst beds in the reformer 40A), in certain existing conditions it may be more feasible to design new reduction systems without said separate heater 34A.

FIG. 3, illustrates yet another variation where the hydrogen rich stream 54c is introduced directly to the hot reducing gas stream 20 prior to its introduction to the reactor system without having been separately heated (thus saving the cost of a separate heater). Since the reformer 40A typically would not have sufficient capacity for heating the additional amount of hydrogen rich gas stream 54c, and the temperature of said stream 54c decreases the temperature of the reducing gas, the addition of the oxygen containing gas 60 is sufficient to increase the temperature of the hot reducing gas stream 20 to the desired levels. In another case (depending on the properties of the ore to be processed), the temperature of the reducing gas stream 20 might be too high and could be decreased intentionally with stream 54 to avoid overheating and resultant sticking of the DRI within the reactor.

FIG. 3 also illustrates a fourth variation similar to the last, but wherein the hydrogen rich stream 54d is instead introduced to the lower part of the reduction reactor (cooling zone) by combination with the cooling gas stream 66. Even though this embodiment of the invention is very useful, it does not take full advantage of the reducing potential of the hydrogen contained is stream 54d, because likely only a relatively small portion of stream 54d could be used in the reduction zone.

FIG. 4, similar to FIG. 2, shows how the present invention can be applied to an existing "self reformer" type installation. In this embodiment, the natural gas feed 36 can be diminished in quantity and potentially even eliminated by use of an alternative natural gas feed 36A to the cooling zone. In FIG. 4, a full cooling recycle loop is illustrated, including the inlet 66 and outlet 68 of the cooling gas stream, the quench cooler 39, and the compressor 41. The natural gas feed 36A is to the gas inlet 66. FIG. 4 also includes a connection 43 from the cooling gas loop to the reducing gas loop which can function as an indirect makeup gas external feed to the reducing zone (which could completely replace the feed in line 36).

Depending upon how the valves 35 and 37 are set, this can take any of a number of configurations. Of course, if one particular configuration is preferred, then the valves, piping and cooling loop elements can be included or omitted as appropriate. Other variations not specifically illustrated could be made, such as having compressor 41 positioned immediately after quench cooler 39 so that line 43 could feed downstream of compressor 32, rather than upstream.

Among the illustrated variations, if valve 37 is closed and valve 35 open, then the compressor 41 would be inoperative and not needed. In such case, all of the natural gas added would be fed in through line 36A, pass through the cooling zone 14 (where some would be used for adjusting the carbon content of the hot descending DRI, some would be endothermically partially reformed in the presence of such DRI, a portion could flow upwardly from the cooling zone 14 already partially heated by the hot descending DRI for further reformation and use for reduction in the reducing zone 12, with the remainder passing externally from the reactor through outlet 68, cleaned and quench cooled in quench 39, pass on through open valve 35 in connecting line 43 and ultimately be fed to the reducing gas recycle loop at line 28.

An alternative configuration would be with both valves 35 and 37 open for those installations where the once-through flow of natural gas in the cooling zone 14 is insufficient and therefore recycling in the cooling loop is required.

A further configuration of FIG. 4 would be with both valves 35 and 37 closed. This would be the equivalent of having only natural gas from line 36A feed through line 66 into the cooling zone 14 (with no cooling recycle) with all of such natural gas flowing upwardly into the reduction zone 12. This would insufficiently cool the exiting DRI 18 for cool discharge and would be alternatively too much cooled for hot discharged for briquetting or charging to an electric art furnace, if all of the natural gas feed were completely through line 36A. Consequently, a balance between a feed through line 36A and line 36 would typically be made by appropriate adjustment to existing process conditions.

FIG. 5 is very similar to FIG. 4, but shows a further variation where line 43 connecting the cooling gas loop and the reducing gas loop instead of feeding into line 28 upstream of the compressor 32 and heater 34, instead feeds to line 20 downstream of the heater 34, thus requiring an auxiliary heater 34B (in those cases where the partial combustion of added oxygen at 60, would be insufficient or too disruptive of the gas composition fed in line 20 into the reducing zone).

The embodiment in FIG. 6 is similar to the various embodiments illustrated in FIG. 3 (wherein an "in line" reformer 40A is utilized) but further modified to have natural gas feed, preferably supplemental to feed 36, be to the cooling loop through line 36A.

Another advantage of the present invention results from the recycle stream having a higher content of hydrogen, which makes it possible to process a higher amount of gas due to the low heat capacity of hydrogen as compared to the heat capacity of the CO. This characteristic of hydrogen, allows one to process a larger amount of reducing gas through the gas heater or the reformer of a given size. Also, when one withdraws only $CO_2$ from the recycled gas stream 30 (as in most of the current prior art), the ratio between CO and $CO_2$ is increased to higher levels. That causes the gas to have a higher carburizing potential, which could cause the metal dusting effect inside of the heater pipes or in the reformer pipes, due to the reaction:

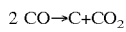

Metal dusting a well known problem, which involves is an attack at process temperatures by carbon on the steel of the process equipment. With the present invention, the main component of the recycled stream is hydrogen, which avoids the metal dusting problems. It has been found that a ratio $CO/CO_2$ higher than 3 could cause carburizing problems in the thermal equipment, unless special alloys or inhibitors are used.

Another advantage of the invention that results from recycling mainly hydrogen, whose molecule is lighter than the CO, is in enabling a larger amount of recycle gas to pass through the reduction reactor and through the solid particles therein with a small increase in the pressure drop through said reactor and other equipment (such as the reformer or heater). With this advantage, the electric energy required by the compressor to circulate the reducing gas is decreased.

EXAMPLE

An example of the claimed process as calculated for potential implementation of an existing reduction system of the type illustrated in FIG. 1 (but with a cooling gas loop and natural gas feed thereto, as in FIG. 6). This is described as follows. A reducing gas 46 produced in steam-natural gas reformer 40 has the following composition on a dry basis in volume %:

$H_2$: 50% to 60%
CO: 30% to 37%
$CO_2$: 2% to 3.5%
$CH_4$: 1% to 3%
$N_2$: 0% to 1.5% with the rest being lesser amounts of other hydrocarbons and inert gases.

This gas is fed as make up to the reduction system as stream 46. About 50% of the top gas 26 from the reduction zone is diverted as stream 30, with a composition on a dry basis in volume % as follows:

$H_2$: 35% to 45%
CO: 18% to 25%
$CO_2$: 10% to 20%
$CH_4$: 2% to 4%
$N_2$: 0% to 3%.

This is compressed and passed through a PSA adsorption system 52. A gas stream 54 is obtained with a hydrogen content in volume % on a dry basis between of 92% and 99%. The recuperation of hydrogen from the gas stream 30 which is now used as chemical reductant instead of being used only as fuel, produces an increase in the rate of production of the reduction reactor in the best conditions up to about 50%.

From the foregoing description it should be apparent that the present invention provides a process capable of achieving the several objects of the invention set forth above. Thus it provides a novel and exceptionally efficient method of increasing the production capacity of existing reduction systems by advantageously utilizing hydrogen which in the prior art is purged and burned as fuel, instead of taking advantage of its chemical reducing potential.

Depending on the composition of the reducing gas to be treated for recovering its hydrogen content, approximately 40% by volume of the overall effluent gas treated is recycled. The rest of the effluent gas is burned as fuel.

As an example, if a reducing gas 30 has the following composition (by volume):

H2: 55%;
CO: 21%;
$CO_2$: 15%;
$CH_4$: 6%;
$N_2$: 1%;
$H_2O$: 2%;

and is treated in a CO and $CO_2$ removal unit 52, the hydrogen rich stream 54 could contain: 95% to 100% by volume of $H_2$; and the hydrogen poor stream 56 would be composed of:

$H_2$: 25%;
CO: 35%;
$CO_2$: 26%;
$CH_4$: 11%;
$N_2$: 1%;
$H_2O$: 2%;

From this, it can be seen that more than 75% of the $H_2$ content of the purge stream in this example is recovered for recycle and essentially all of the $CO_2$ content thereof is permanently purged. In another example, if the hydrogen rich stream is 98% $H_2$, the remaining 2% is CO, with only traces of other gases such as $N_2$ or $CH_4$.

It is of course to be understood that the foregoing description is intended to be illustrative only and that numerous changes can be made in the structure of the system described and its operating conditions without departing from the spirit of the invention as defined in the appended claims.

What is claimed is:

1. A method for producing direct reduced iron DRI or prereduced iron ore with improved reducing gas utilization, comprising:

feeding a stream of reducing gas mainly composed of hydrogen and carbon monoxide and also comprising methane, carbon dioxide and water, heated at a temperature between about 750° C. to about 1050° C., to a reduction zone within a reduction reactor wherein solid particles containing iron oxides present therein are reduced by reaction of said iron oxides with said reducing gas;

withdrawing from said reactor said reducing gas after reacting with said iron oxides as top gas;

cooling and cleaning said top gas and removing water therefrom to produce a cooled top gas;

heating and recycling a first portion of said cooled top gas to said reduction reactor as part of said stream of reducing gas;

purging a second portion of said cooled top gas;

adding make-up gas to gases eventually recycled to the reducing zone;

separating from said second portion of said cooled top gas at least the majority of the hydrogen contained therein to form a hydrogen rich gas stream which is lean in carbon dioxide, and recycling said hydrogen rich gas stream to said reduction reactor.

2. A method according to claim 1, wherein said hydrogen rich gas stream has substantially no carbon dioxide and has significantly less nitrogen relative to said second portion.

3. A method according to claim 1, wherein the separation of $H_2$ from said second portion of said cooled top gas is made in a PSA or a VPSA adsorption unit.

4. A method according to claim 1, wherein the separation of $H_2$ from said second portion of said cooled top gas is made in a $CO_2$ chemical absorption unit.

5. A method according to claim 3, wherein said hydrogen rich gas stream has an hydrogen content equal to or higher than 92% in volume.

6. A method according to claim 3, wherein said hydrogen rich gas stream has an hydrogen content equal to or higher than 95% in volume.

7. A method according to claim 5, further comprising producing a reducing gas as the make-up gas in a steam-natural gas reformer; combining said make-up reducing gas with said first portion of said reducing gas; heating the combination of the first portion and the make up gas to a temperature higher than 750° C. and introducing it to said reduction zone.

8. A method according to claim 5, further comprising combining as the make up gas a natural gas stream or another reformable hydrocarbon, with said first portion of said cooled top gas; circulating such combination through a $CO_2$-natural gas reformer thereby producing said stream of reducing gas and introducing said stream of reducing gas to said reduction zone.

9. A method according to claim 5, further comprising combining as the make up gas a humidified natural gas stream with said cooled top gas stream and heating said combined stream to form said stream of reducing gas stream, whereby the natural gas present in the reducing gas fed to the reduction zone is largely reformed within the reduction zone taking advantage of the catalytic action of the metallic iron within said reduction reactor.

10. A method according to claim 7, further comprising injecting an oxygen or air enriched with oxygen stream to the stream of reducing gas prior to its introduction to said reduction reactor.

11. A method according to claim 8, further comprising injecting an oxygen or air enriched with oxygen stream to the stream of reducing gas prior to its introduction to said reduction reactor.

12. A method according to claim 9, further comprising injecting an oxygen or air enriched with oxygen stream to the stream of reducing gas prior to its introduction to said reduction reactor.

13. A method according to claim 10, wherein said oxygen or air enriched with oxygen stream has an oxygen content higher than 30% in volume.

14. A method according to claim 11, wherein said oxygen or air enriched with oxygen stream has an oxygen content higher than 30% in volume.

15. A method according to claim 12, wherein said oxygen or air enriched with oxygen stream has an oxygen content higher than 30% in volume.

16. A method according to claim 5, further comprising combining hydrogen rich gas stream, with said reducing gas stream and introducing said combination to said reduction zone.

17. A method according to claim 12, further comprising heating said hydrogen rich gas stream in a separate heater separate from any prior to its introduction to said reduction zone.

18. A method according to claim 5, further comprising feeding said hydrogen gas stream to a cooling zone of said reduction reactor.

19. A method according to claim 5, further comprising feeding natural gas to a cooling zone of said reduction reactor.

20. A method according to claim 7, further comprising feeding natural gas to a cooling zone of said reduction reactor.

21. A method according to claim 8, further comprising feeding natural gas to a cooling zone of said reduction reactor.

22. A method according to claim 9, further comprising feeding natural gas to a cooling zone of said reduction reactor.

23. A method according to claim 10, further comprising feeding natural gas to a cooling zone of said reduction reactor.

24. An apparatus for producing prereduced materials, including DRI, with improved reducing gas utilization, comprising:

a reduction reactor having a reduction zone with a gas inlet and a gas outlet;

a gas cooler in fluid communication with the gas outlet of said reduction zone;

a reducing gas heater in fluid communication with the gas inlet of said reduction zone;

first pumping device connected to said cooler and to said heater to recycle reducing gas from said gas outlet to said gas inlet;

conduit device for diverting a portion of the reducing gas effluent from said gas outlet of said reduction zone to second pumping device;

a separating device for producing a hydrogen rich output and a hydrogen lean output with the carbon dioxide content;

a conduit device communicating said second pumping device to said separating device; and a conduit device to communicate from said hydrogen rich output of the separating device to between said first pumping device and the gas inlet of said reduction zone.

25. An apparatus according to claim 24, wherein said separating device is a chemical absorption unit.

26. An apparatus according to claim 24, wherein said separating device is a physical adsorption PSA or VPSA unit.

* * * * *

US006027545C1

(12) EX PARTE REEXAMINATION CERTIFICATE (9330th)
United States Patent
Villarreal-Trevino

(10) Number: US 6,027,545 C1
(45) Certificate Issued: Oct. 4, 2012

(54) METHOD AND APPARATUS FOR PRODUCING DIRECT REDUCED IRON WITH IMPROVED REDUCING GAS UTILIZATION

(75) Inventor: Juan A. Villarreal-Trevino, Guadalupe (MX)

(73) Assignee: Hylsa S.A. de C.V., San Nicolas de los Garza (MX)

Reexamination Request:
No. 90/011,384, Dec. 13, 2010

Reexamination Certificate for:
Patent No.: 6,027,545
Issued: Feb. 22, 2000
Appl. No.: 09/252,875
Filed: Feb. 18, 1999

Related U.S. Application Data

(60) Provisional application No. 60/075,313, filed on Feb. 20, 1998.

(51) Int. Cl.
*C21B 13/00* (2006.01)
*C21B 13/02* (2006.01)

(52) U.S. Cl. ............... 75/490; 75/495; 75/505; 266/155
(58) Field of Classification Search .................... 75/490
See application file for complete search history.

(56) References Cited

To view the complete listing of prior art documents cited during the proceeding for Reexamination Control Number 90/011,384, please refer to the USPTO's public Patent Application Information Retrieval (PAIR) system under the Display References tab.

*Primary Examiner* — Krisanne Jastrzab

(57) ABSTRACT

A method and apparatus for producing DRI, prereduced materials, or the like, utilized in the steelmaking industry, where hydrogen contained in the gas stream purged from the reduction reactor is separated (preferably by means of a PSA system) and recycled to said reduction reactor. The productivity of the reduction plant is increased by using the separated hydrogen as a chemical reductant in the reactor, instead of using it as fuel. This is particularly useful in upgrading existing DRI production plants.

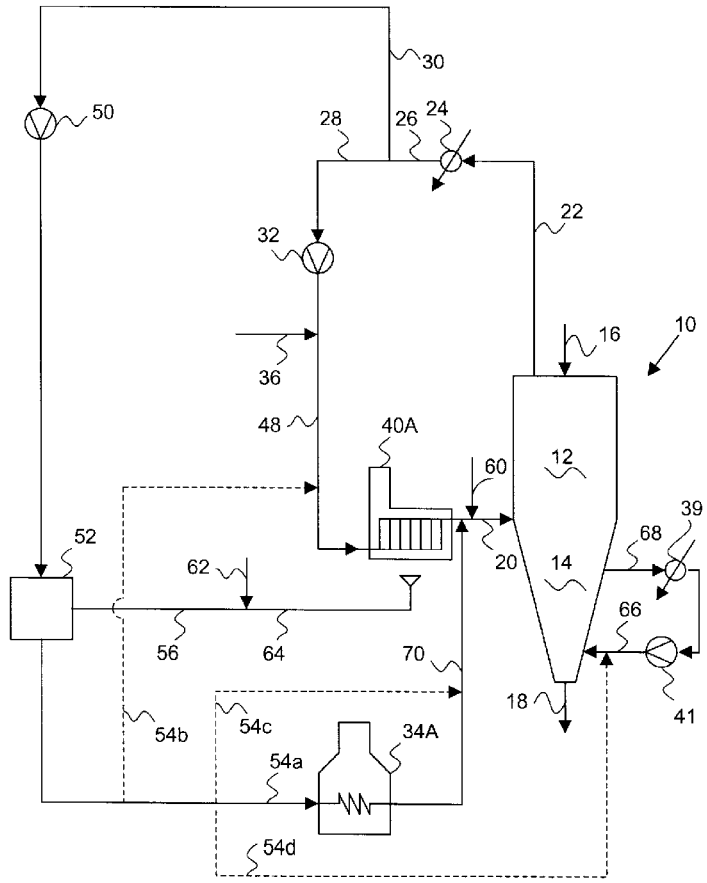

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7, 9, 12, 15-18, 20 and 22 are cancelled.

Claims 1, 5-6, 8, 10 and 24 are determined to be patentable as amended.

Claims 2-4, 11, 13-14, 19, 21, 23 and 25-26, dependent on an amended claim, are determined to be patentable.

1. A method for producing direct reduced iron [DRI] (*DRI*) or prereduced iron ore with improved reducing gas utilization, *in a direct reduction plant comprising a reduction reactor, a reformer, a gas heater separate from said reformer, and a carbon dioxide removal system, said method* comprising:

feeding a stream of reducing gas mainly composed of hydrogen and carbon monoxide and also comprising methane, carbon dioxide and water, heated at a temperature between about 750° C. to about 1050° C., to a reduction zone within [a] *said* reduction reactor wherein solid particles containing iron oxides present therein are reduced by reaction of said iron oxides with said reducing gas;

withdrawing from said reactor said reducing gas after reacting with said iron oxides as top gas;

cooling and cleaning said top gas and removing water therefrom to produce a cooled top gas;

heating *in said reformer* and recycling, *without separating carbon dioxide therefrom,* a first portion of said cooled top gas to said reduction reactor as part of said stream of reducing gas, *wherein the first portion of said cooled top gas heated in and output by said reformer is not heated in said gas heater prior to being input to said reduction zone*;

purging a second portion of said cooled top gas;

adding make-up gas to gases eventually recycled to the [reducing] *reduction* zone;

separating, *via said carbon dioxide removal system,* from said second portion of said cooled top gas at least the majority of the hydrogen contained therein to form a hydrogen rich gas stream which is lean in carbon dioxide, and;

heating *in said gas heater and* recycling said hydrogen rich gas stream *lean in carbon dioxide* to said reduction reactor *as part of said stream of reducing gas fed to said reduction zone, wherein said hydrogen rich gas stream heated in and output by said gas heater is not heated in said reformer prior to being input to said reduction zone*.

5. A method according to claim 3, wherein said hydrogen rich gas stream *lean in carbon dioxide* has [an] *a* hydrogen content equal to or higher than 92% in volume.

6. A method according to claim 3, wherein said hydrogen rich gas stream has [an] *a* hydrogen content equal to or higher than 95% in volume.

8. A method according to claim 5, further comprising combining as the [make up] *make-up* gas a natural gas stream, or another reformable hydrocarbon, with said first portion of said cooled top gas; circulating such combination through [a $CO_2$ -natural gas] *said* reformer thereby producing said stream of reducing gas and introducing said stream of reducing gas to said reduction zone.

10. A method according to claim [7] *1*, further comprising injecting an oxygen or air enriched with oxygen stream to the stream of reducing gas prior to its introduction to said reduction reactor.

24. An apparatus for producing prereduced materials, including DRI, with improved reducing gas utilization, comprising:

a reduction reactor having a reduction zone with a gas inlet and a gas outlet;

a gas cooler in fluid communication with the gas outlet of said reduction zone;

a [reducing gas heater] *reformer* in fluid communication with the gas inlet of said reduction zone;

first pumping device connected to said cooler and to said [heater] *reformer* to recycle reducing gas from said gas outlet *through said reformer* to said gas inlet;

*first* conduit device for diverting a portion of the reducing gas effluent from said gas outlet of said reduction zone to *a* second pumping device;

a separating device for producing a hydrogen rich output and a hydrogen lean output with the carbon dioxide content;

a *second* conduit device communicating said second pumping device to said separating device; and

*a gas heater that is separate from said reformer and is operable to heat the hydrogen rich output and provide a heated hydrogen rich output;* a *third* conduit device to communicate from said hydrogen rich output of the separating device to [between said first pumping device and] *said gas heater; and*

*a fourth conduit device to communicate the heated hydrogen rich output of the gas heater to* the gas inlet of said reduction zone.

* * * * *

(12) EX PARTE REEXAMINATION CERTIFICATE (9935th)
United States Patent
Villarreal-Trevino

(10) Number: US 6,027,545 C2
(45) Certificate Issued: Nov. 12, 2013

(54) METHOD AND APPARATUS FOR PRODUCING DIRECT REDUCED IRON WITH IMPROVED REDUCING GAS UTILIZATION

(75) Inventor: Juan A. Villarreal-Trevino, Guadalupe (MX)

(73) Assignee: Hylsa S.A. de C.V., San Nicolas de los Garza (MX)

Reexamination Request:
No. 90/012,853, Apr. 30, 2013

Reexamination Certificate for:
Patent No.: 6,027,545
Issued: Feb. 22, 2000
Appl. No.: 09/252,875
Filed: Feb. 18, 1999

Reexamination Certificate C1 6,027,545 issued Oct. 4, 2012

Related U.S. Application Data

(60) Provisional application No. 60/075,313, filed on Feb. 20, 1998.

(51) Int. Cl.
*C21B 13/02* (2006.01)
*C21B 13/00* (2006.01)

(52) U.S. Cl.
CPC ............. *C21B 13/00* (2013.01); *C21B 13/02* (2013.01)
USPC ............. 75/490; 75/495; 75/505; 266/155

(58) Field of Classification Search
None
See application file for complete search history.

(56) References Cited

To view the complete listing of prior art documents cited during the proceeding for Reexamination Control Number 90/012,853, please refer to the USPTO's public Patent Application Information Retrieval (PAIR) system under the Display References tab.

*Primary Examiner* — Norca L Torres Velazquez

(57) ABSTRACT

A method and apparatus for producing DRI, prereduced materials, or the like, utilized in the steelmaking industry, where hydrogen contained in the gas stream purged from the reduction reactor is separated (preferably by means of a PSA system) and recycled to said reduction reactor. The productivity of the reduction plant is increased by using the separated hydrogen as a chemical reductant in the reactor, instead of using it as fuel. This is particularly useful in upgrading existing DRI production plants.

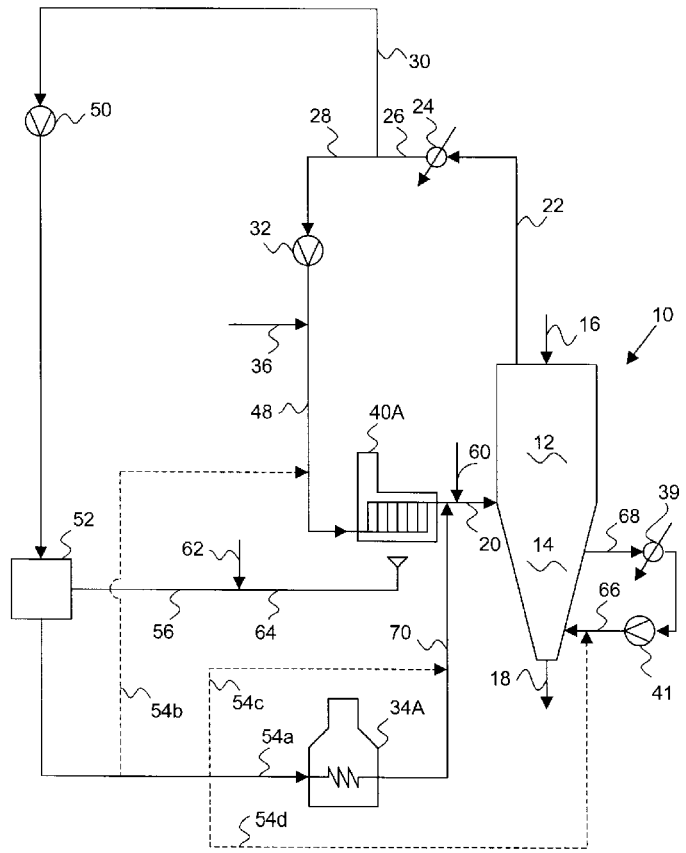

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6, 8, 10, 11, 13, 14, 19, 21 and 23-26 is confirmed.

Claims 7, 9, 12, 15-18, 20 and 22 were previously cancelled.

* * * * *